(12) United States Patent
Skibo et al.

(10) Patent No.: US 7,631,004 B2
(45) Date of Patent: Dec. 8, 2009

(54) SYSTEMS AND METHODS FOR CREATING A TEMPLATE FROM AN EXISTING FILE

(75) Inventors: Craig A. Skibo, Sammamish, WA (US); Stephanie S. Saad, Kirkland, WA (US); Stephen L. Rakonza, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 313 days.

(21) Appl. No.: 10/961,753

(22) Filed: Oct. 8, 2004

(65) Prior Publication Data

US 2006/0080329 A1    Apr. 13, 2006

(51) Int. Cl.
   *G06F 7/00*    (2006.01)
(52) U.S. Cl. .................. 707/102; 717/107; 713/176
(58) Field of Classification Search ............. 707/200, 707/10, 3; 713/176; 717/107; 709/219
   See application file for complete search history.

(56) References Cited

U.S. PATENT DOCUMENTS

| 5,729,748 | A | 3/1998 | Robbins et al. | 717/137 |
|---|---|---|---|---|
| 5,978,579 | A * | 11/1999 | Buxton et al. | 717/107 |
| 6,427,228 | B1 | 7/2002 | Wigger | 717/111 |
| 2001/0047365 | A1 * | 11/2001 | Yonaitis | 707/200 |
| 2002/0194480 | A1 * | 12/2002 | Nagao | 713/176 |
| 2003/0105778 | A1 * | 6/2003 | Andani | 707/200 |
| 2005/0057560 | A1 | 3/2005 | Bibr et al. | |
| 2005/0071805 | A1 | 3/2005 | Lauterbach et al. | |
| 2005/0114381 | A1 * | 5/2005 | Borthakur et al. | 707/102 |
| 2005/0138558 | A1 | 6/2005 | Duevel et al. | |
| 2005/0198100 | A1 | 9/2005 | Goring et al. | |
| 2006/0080329 | A1 | 4/2006 | Skibo et al. | |
| 2006/0161880 | A1 | 7/2006 | Saad et al. | |
| 2007/0033088 | A1 | 2/2007 | Aigner et al. | |
| 2007/0150855 | A1 | 6/2007 | Jeong | |

OTHER PUBLICATIONS

Zdun, Uwe, Dynamically Generating Web Application Fragments from Page Templates ,Specification of Software Systems, SAC 2002, Madrid, Spain.*

Pyron Tim, "Special Edition Using Microdoft Project 2002", Que, Aug. 5, 2002.*

Boisson, C. et al., "Template Generation for Identifying Text Patterns," *Foundations of Intelligent Systems. 12th International Symposium, ISMIS 2000.* Proceedings, Charlotte, North Carolina, Oct. 11-14, 2000, 463-473.

(Continued)

*Primary Examiner*—Charles Rones
*Assistant Examiner*—Dinku W Gebresenbet
(74) *Attorney, Agent, or Firm*—Woodcock Washburn LLP

(57) ABSTRACT

Systems and methods for creating a template from an existing file are provided. The user can package one or more file(s) into a group and specify that the group is to be converted into a template. An IDE process can automatically index the content of the group and create a metadata file to represent the indexed content. The IDE process may employ a set of standard inference rules to index the content. The indexed file group and metadata can serve as a template for creating new files with properties of the original file(s). Additionally, templates can be provided with a set of default properties when no specific template properties are specified by a user. Completed templates can be added to a User Interface (UI) accessible location, such as a collection of templates accessible to UI dialog processes for opening new files.

21 Claims, 5 Drawing Sheets

OTHER PUBLICATIONS

Handschuh, S. et al., "Cream: Creating Metadata for the Semantic Web," *Computer Networks*, 2003, 42(5), 579-598.

Lei, L. et al., "Design and Implementation of a Report-Component Generating System Based on Software Reuse," *Mini-Micro Systems*, 2003, 24(4), 739-743 (English language abstract included).

Mukherjee, S. et al., "Automatic Discovery of Semantic Structures in HTML Documents," *Proceedings Seventh International Conference on Document Analysis and Recognition*, Edinburgh, UK, Aug. 3-6, 2003, 1, 245-249.

Postnikov, V.V., "Identification and Recognition of Documents with a Predefined Structure," *6th International Conference on Pattern Recognition and Image Analysis: New Information Technologies*, Velikii Novgorod, Russia, Oct. 21-26, 2002, 13(2), 332-334.

\* cited by examiner

SYSTEMS AND METHODS FOR CREATING A TEMPLATE FROM AN EXISTING FILE

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2003-2004, Microsoft Corp.

FIELD OF THE INVENTION

This invention relates to computing, and more particularly to the use of document templates for speedy creation of files with a plurality of desired properties, and more particularly to the facilitated generation of customized templates.

BACKGROUND OF THE INVENTION

Modern computer users are familiar with the use of file templates. File templates allow a user to create a new file with a readymade set of initial properties, instead of starting work on a new file from scratch. One common template is a letter template in a word processing program, such as MICROSOFT WORD®. A user of such a template may first select the appropriate template, which operates to create a new file with desirable file properties. The user may then be prompted to enter data into several fields. For example, the user may fill in an address field, a date field, a salutation field, and so on. After inserting data into the fields, the user may go on to add additional content to the letter, and save it to a desired location. There are presently many kinds of templates available. Letters, resumes, memos, and so forth are commonly created from word processing application templates, while web pages of various styles are created from templates in webpage editing software, and various files created for software applications are generated from templates in Integrated Development Environments (IDEs).

More particularly, with reference to IDE's, note that most modern software is typically created with a great deal of computer automated assistance. Such assistance is commercially available through any of a number of IDEs. For example, MICROSOFT'S VISUAL STUDIO®, BORLAND'S C++ BUILDER®, METROWERK'S CODE WARRIORS®, and IBM'S WEBSPHERE STUDIO® are all products presently available to assist in software creation. Such products provide a range of useful functions, such as templates for creating new files, that may be subsequently adapted to the particular needs of an undertaking. Other IDE functions include coordinating communications between multiple developers working together on large applications, assisting in the actual writing of source code, assisting in specifying how a source code file will be compiled, and providing compilers and other processes that convert source code files and the like into executable files.

While many IDE users are familiar with and commonly use templates, fewer IDE users create their own templates for later use. This is at least in part because the creation of templates in modern IDEs is time-consuming, difficult, and error prone. It involves the creation of at least two, if not more, separate files to instruct a template building engine in the details of desired template properties. A first file may point to a template wizard dialog process which allows user insertion of file properties. A second file provides the code for placing and formatting the user-entered data into the document created from the template. Because the second file is a code file that operates in conjunction with the template building engine, the template building engine is susceptible to attacks, bugs, and malfunction.

The difficulty of creating custom templates in modern IDEs is particularly troublesome in light of the working needs of modern software developers. Developers are a group of computer users who uniquely benefit from the use of templates. Developers understand the details of their own work better than the properties of a factory-provided template. Developers may often work on related software projects, or improvements and optimizations of past projects, that lend themselves to re-use of previously developed code. Redundant coding is highly inefficient and can be frustrating for developers as they reconsider problems that may have already been thought through.

Perhaps more importantly, leveraging past work without a template can be error-prone. When a previously developed file is re-used, the properties of the file must be uniformly updated, or the resulting software may not operate properly. An automated process can offer greater efficiency and accuracy in carrying out such updating. Thus, developers are a group of computer users that derive particular advantage from the use of templates, so the ability to efficiently create new, custom templates is a feature of great advantage in IDE software. In light of the above, there is a need in the industry to simplify the process of creating custom templates in IDEs.

SUMMARY OF THE INVENTION

In consideration of the above-identified shortcomings of the art, the present invention provides systems and methods for creating a template from an existing file. The user can package one or more file(s) into a group, such as a ZIP file, and place the group in a memory location, such as one of a set of pre-defined directory locations. An IDE process can automatically index the content of the group and create a metadata file to represent the indexed content. The indexing can range from minimal to extensive in embodiments of the invention. The IDE process may employ a set of standard inference rules to index the content. The indexed file group and metadata can serve as a template for creating new files with properties of the original file(s). Additionally, templates can be provided with a set of default properties when no specific template properties are specified by a user. Completed templates can be added to a user interface (UI) accessible location, such as a collection of templates accessible to UI dialog processes for opening new files. Other advantages and features of the invention are described below.

BRIEF DESCRIPTION OF THE DRAWINGS

The systems and methods for creating a template from an existing file in accordance with the present invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below.

Figure 1:
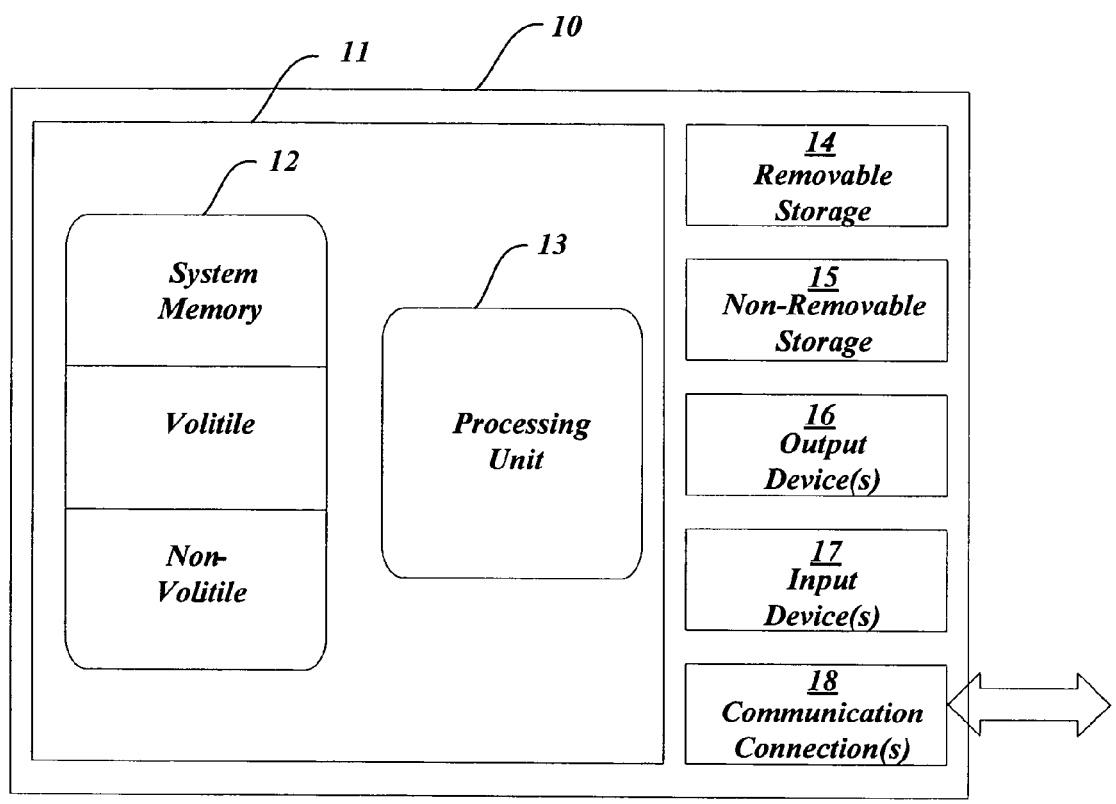
FIG. 1 illustrates a simplified computing device 10 representing an environment with a processor 13 and memory 12 in which embodiments of the invention may be implemented.

With reference to FIG. 1, an exemplary system for implementing the invention includes a computing device, such as computing device 10. In its most basic configuration, computing device 10 typically includes at least one processing unit 13 and memory 12. Memory 12 is one example of computer readable media, but computer readable media as that term is used here can be any media that can be accessed by 10. Depending on the exact configuration and type of computing device, computer readable media such as memory 12 may be volatile (such as RAM), non-volatile (such as ROM, flash memory, etc.) or some combination of the two.

Device 10 may also have additional features/functionality. For example, device 10 may also include additional storage (removable 14 and/or non-removable 15) including, but not limited to, magnetic or optical disks or tape. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 18 that allow the device 10 to communicate with other devices. Communications connection(s) 18 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 10 may also have input device(s) 17 such as keyboard, mouse, pen, voice input device, touch input device, etc. Output device(s) 16 such as a display, speakers, printer, etc. may also be included. All these devices are well known in the art and need not be discussed at length here.

Figure 2:
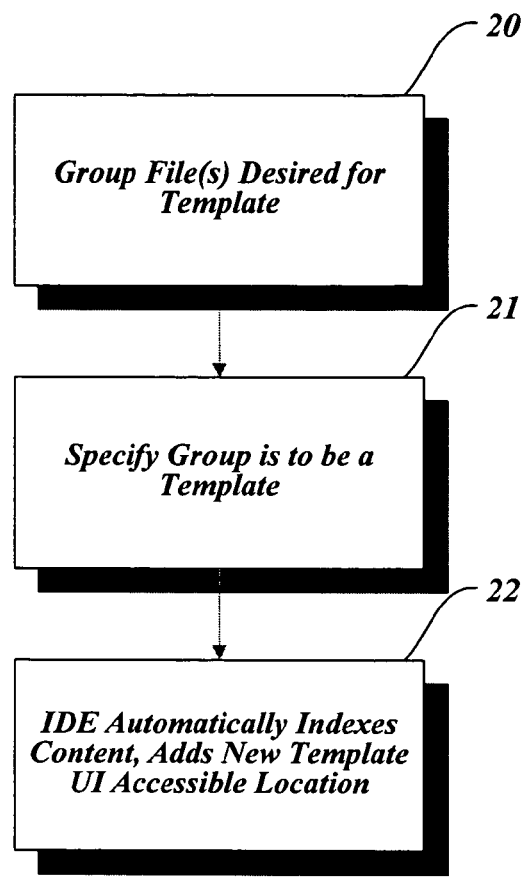
FIG. 2 is a flowchart that provides an interaction sequence between a user and an Integrated Development Environment (IDE) when the user creates a template from an existing file using embodiments of the systems and/or methods of the invention.

Software instructions may be stored in computer readable media to instruct a computer to carry out the steps of the invention. With reference to FIG. 2, three steps 20, 21, 22 are illustrated to provide an example of the use of embodiments of the invention. There are any number of implementations that may allow a user to create a template using the three steps 20, 21, 22 shown here. Some of these implementations are described in detail herein. The three steps are, first, for a user to group any files together that he wishes to include in a template 20. Second, the user may specify that that the file or file group is to be stored as a template 21. Finally, the IDE automatically indexes the group and adds a new template to a collection of templates 22. By allowing users to create new templates through these simple steps, embodiments of the invention greatly facilitate the creation of templates.

Referring first to the first step 20 of FIG. 2, a typical situation in which files will be grouped for conversion into a template involves a project or comparable group of files in MICROSOFT VISUAL STUDIO®, or comparable IDEs. Many IDEs have projects or their equivalent. A project is a file or plurality of files that cooperate to accomplish a unified set of application functions. In general, if a template is to be created from a project, the "project file" within the project, i.e., the file that operates to bind the various code files together, must be valid.

A typical situation in which it may be desirable to convert a single file into a template involves an item in MICROSOFT VISUAL STUDIO®, or comparable IDEs. Many IDEs have items or their equivalent. An item is a file that contains information such as code that accomplishes some discrete unit of functionality. In general, if a template is to be created from an item, it may be desirable to restrict the number of files in a group to one.

There are any number of ways to associate a plurality of files, such as those of a project or item, in step 20. Various embodiments may allow a user to package the project or item as a ZIP file, which is a widely available compressed file format. Other ways to associate multiple files comprise placing them in a single folder, naming them with a common identifying string, and so forth. When a group is formed using the method of "ZIP"ing the various files of the group into a single ZIP file, it may be preferable in various embodiments to use a single ZIP file as an umbrella for all files that are to be converted to a template.

Referring next to the second step 21 of FIG. 2, the user can specify that the group of files is to be converted into a template. In preferred embodiments, this action can comprise placing the group in one of a set of pre-defined directories. For instance, there may be a directory that is identified as "convert to template," "templates," "new templates," "custom templates," or the like. The action of placing the group in the directory can operate to instruct a process in the IDE to create a template from the group. Of course, any number of techniques may be used to specify that the group should be made into a template. For example, the files could be highlighted and a menu item such as "convert to template" could be selected from a plurality of options provided in an IDE Graphical User Interface (GUI). Alternatively, a dialog could be provided into which the names and/or file paths of the file(s) of the group could be entered. These are but a few suggestions out of many possible options for specifying that a template is to be made using file(s) of a template group.

Figure 3:
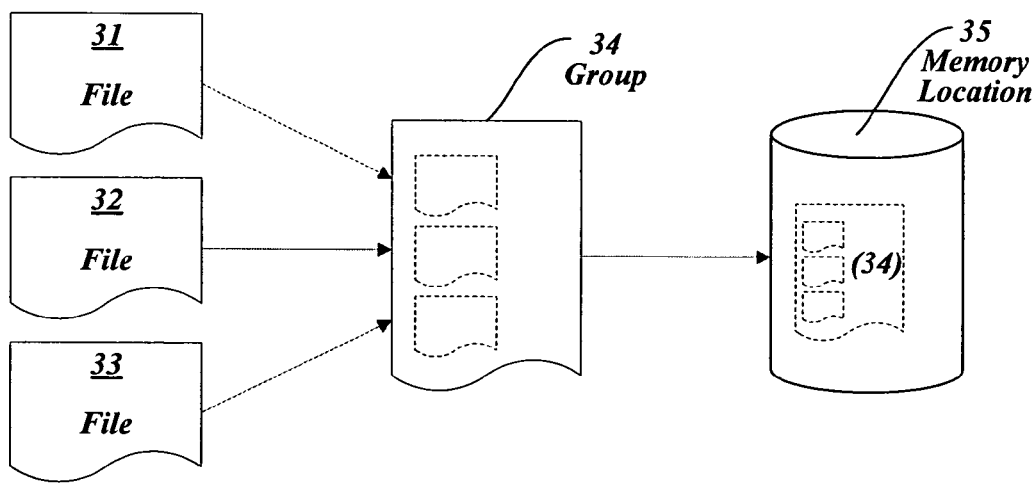
FIG. 3 provides a graphical representation of the first two steps, 20 and 21, from FIG. 2. One or more file(s) 31, 32, 33 may be grouped together, as represented by 34, and the group may be placed in a memory location 35. In these embodiments, the placement of group 34 in location 35 may operate to specify the group 34 is to be converted into a template, as set forth in element 21 of FIG. 2.
Figure 4:
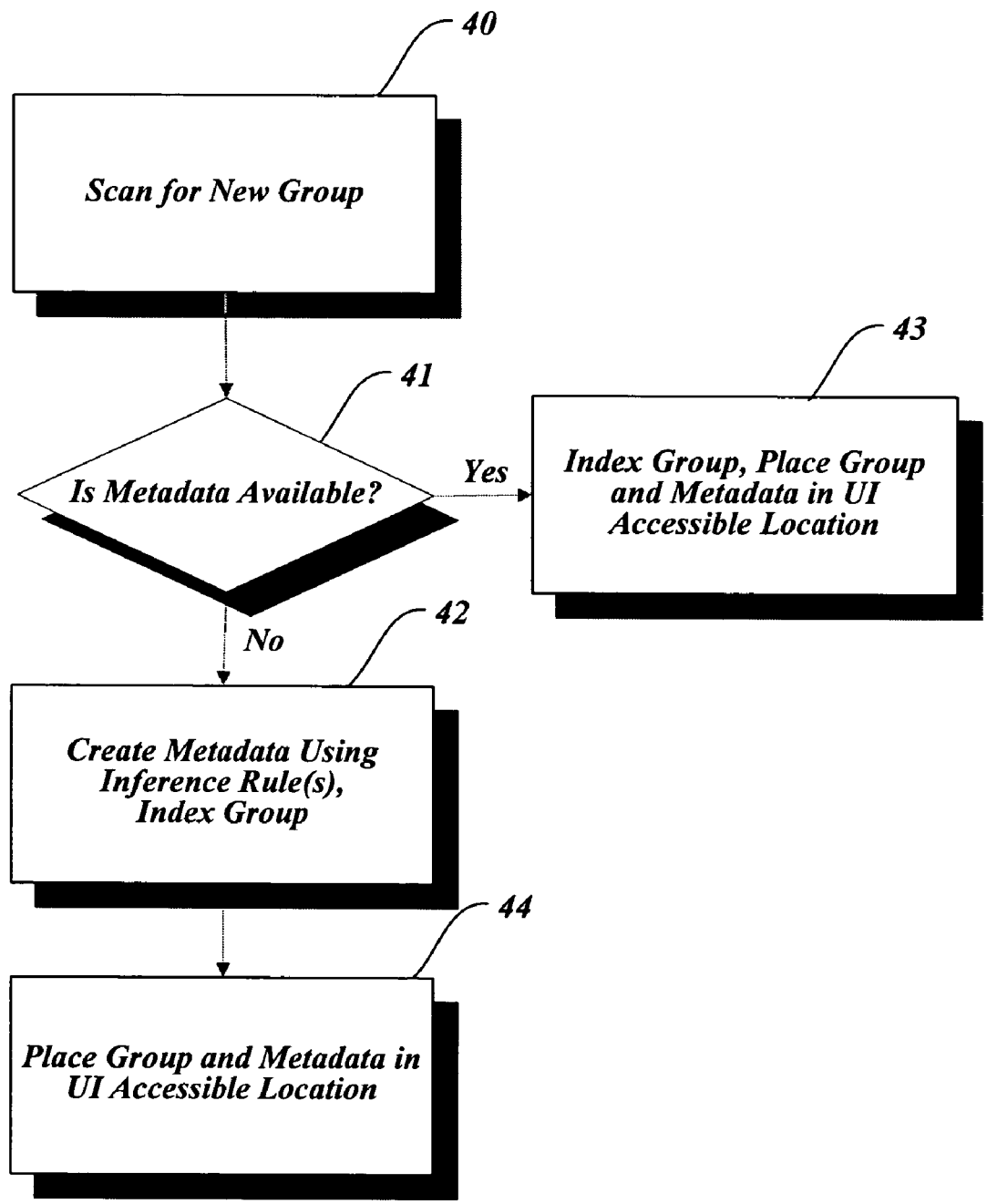
FIG. 4 illustrates a more detailed view of available methods for carrying out the third step 22 in FIG. 2.
Figure 5:
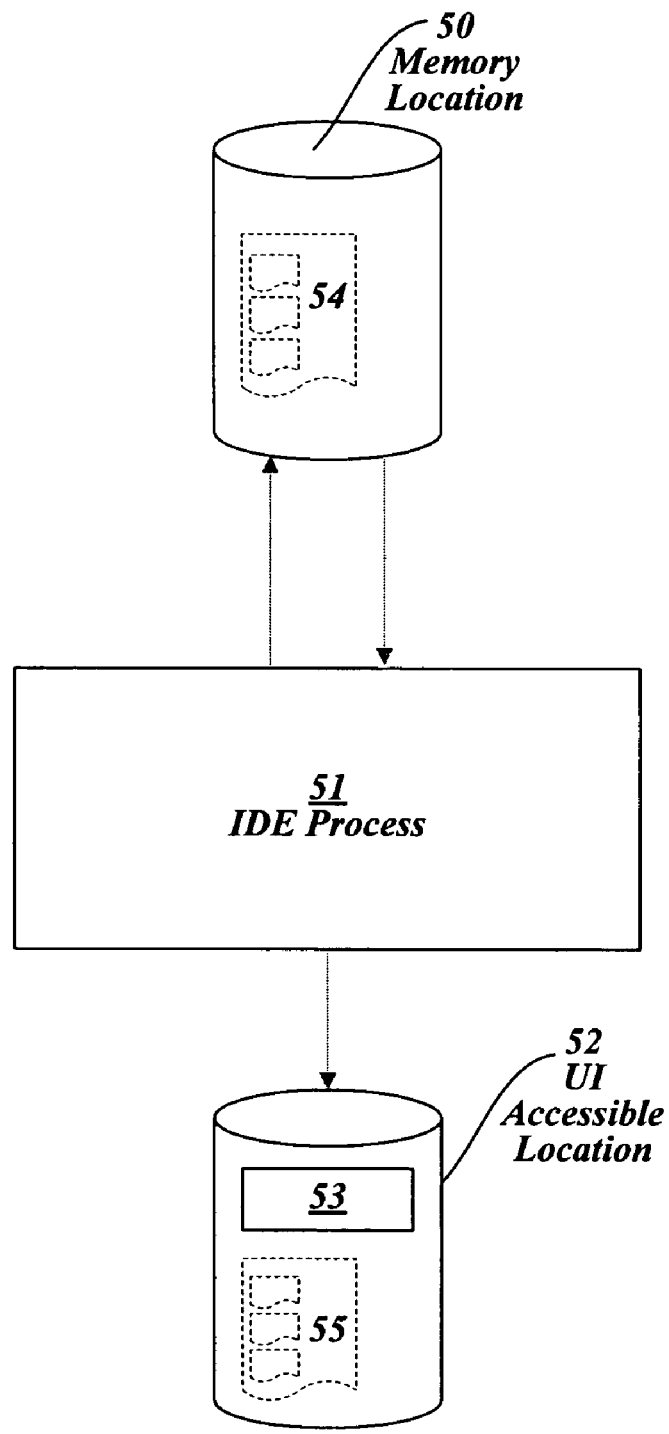
FIG. 5 provides a graphical representation of the steps in FIG. 4. An IDE process 51 can scan memory location 50, and convert any file groups, e.g., 54, therein into templates by creating metadata 53 for the file(s), indexing the file group, and placing the indexed group 55 and metadata 53 in a user interface (UI) accessible location.

Embodiments of the invention allow the user to take the first two steps 20 and 21, while an automated process can take the final step 22. FIG. 3 provides a graphical representation of the first two steps, 20 and 21. FIG. 4 and FIG. 5 present a more detailed view of step 22.

Referring to FIG. 3, files 31, 32, and 33 represent files that are grouped by a user into group 34. 31, 32, and 33 may represent a project in VISUAL STUDIO® or comparable set of files. In embodiments where only one file is converted to a template, that single file, e.g., 31, could be the only file in group 34 (contrary to the illustrated embodiment). Group 34 may be a ZIP file that contains files 31, 32, and 33. In various embodiments, a user may specify that group 34 is to be converted to a template by placing the group in memory location 35. Memory location 35 may be, for example, a predetermined directory location that is periodically scanned by an IDE process for new file groups. The IDE process (not illustrated in FIG. 3) may detect the group 34 in the memory location 35 and trigger the conversion of the group 34 into a template. Various embodiments for this operation are discussed with reference to FIG. 4 and FIG. 5.

Referring back to FIG. 2, the third step 22 may be carried out by one or more automatic processes associated with an IDE. These IDE processes may be occasionally referred to herein as a template engine. The template engine may provide a variety of functions relating to creating and/or utilizing templates. First, it may create templates by indexing the content of a group and creating one or more metadata files representing the indexed information. Second, the template engine may assist a user in utilizing a template by creating a new file from a template. The template engine may instantiate a new file or group of files from the indexed content and metadata, prompt a user to enter data for the new file or group, and insert the entered data, as necessary, throughout a newly created file or group.

As alluded to above, the template engine processes associated with step can be performed in response to an indication that a group is to be used as a template, as in step 21. For example, in embodiments where users can optionally create templates by placing a group on disk in one or more directories for user-added templates, the actions of indexing group content and placing the generated template in a UI accessible location may be taken in response to placement of a group in the directory location. In these embodiments, a user may simply save an existing project, for example, in a ZIP format and place the ZIP file on disk in a correct directory location. The ZIP file can be automatically picked up by the template engine, indexed, and exposed along with a metadata file as a template in the appropriate location for accessing templates. Such an appropriate location may be, for example, a location that is accessible by a "new project" dialog process which offers users a selection of templates to use in creating a new file or group of files. The location may also be considered appropriate if accessible by any other UI process, such as a "new website" dialog and/or an "add new item" dialog.

FIG. 4 and FIG. 5 illustrate various implementations of template engine processes for creating a template from the group placed in a memory location. In this regard, FIG. 4 and FIG. 5 provide a more detailed view of the process that is generally represented in step 22 of FIG. 2.

Starting with FIG. 4, the template engine, or some other IDE process, may first scan the memory location for a new group 40. Scanning the memory location 40 is one means of detecting that a user has specified that a group is to be converted into a template. As mentioned above, other means for detecting are available, such as allowing a user to pass a name of a group to a template engine, or otherwise conveying to a template engine that a group is to be converted to a template.

An IDE may search certain specified directories for (1) Standard vendor provided or approved templates and (2) User templates. Separate search logic may be applied to each subdirectory. For vendor provided or approved templates, a first directory path may lead to the UI accessible location where the templates are stored, and the directory locations for vendor-provided templates may be not modifiable. For user added templates, a second directory path may lead to the UI accessible location where the templates are stored, and that location may be modifiable.

Once a new user-added group is detected, the template engine can proceed to create a template using the group content. The creation of a template from an existing file or files can entail identifying elements of the file(s) that are desirable to generalize, then indexing the file by determining all the occurrences of the identified elements. For example, it is generally useful to generalize the name of a file. Users do not want to name all files using the same name. Instead, a generic name identifier may be inserted into a template, and the user may be prompted to enter a new file name when creating a file from the template. If there are multiple locations in the file where the name is referenced, the processes that create a file from a template can find these locations—because they are indexed—and insert the appropriate string—here, the name—into the indexed locations. The appropriate string may be one that is entered by a user into a template dialog. A metadata file is used in conjunction with an indexed file to supply the identifications of the generalized elements. A UI process can reference the metadata file to prompt users to enter values for the generalized elements.

Returning to FIG. 4, a template engine may treat groups that are supplied with tailored metadata differently than groups that are not initially associated with any metadata. This is represented by the decision 41. Tailored metadata is typically generated by a user familiar with the group, and accurately reflects the properties of the group that the user wishes to index. Thus, if a group has an associated metadata file, it is generally preferable to use the supplied metadata instead of generating fresh metadata. Therefore, when a pre-existing metadata file is supplied with a group, various embodiments may proceed to detect the existence of the tailored metadata file, to index the group according to the supplied metadata, and to place the group in a UI accessible location 43.

Where no metadata is associated with a group, the template engine may instead proceed to create a metadata file for the group 42. The metadata file may be a skeleton metadata file in a file format such as a .VSTEMPLATE file in VISUAL STUDIO®. The properties of the created metadata file may be based on the project, item, or other file that is being converted to a template. A set of inference rules regarding the elements that should be generalized and indexed may be used. These inference rules can be configured to accomplish a level of generalization that is most likely to provide useful gains to users of the output template. If too many elements of the group are generalized, the usefulness of the template may be reduced due the need to provide excessive customization each time the template is used. On the other hand, if too few elements are generalized, the usefulness of the template may be reduced due the absence of automated features. Also, note that it may be difficult or impossible to accurately generalize many elements using inference rules. Some files may use unconventional element identifiers and thus be difficult to convert to a template without tailored metadata. However, many files use predictable element identifiers, and can thus be indexed according to a set of standardized inference rules.

The following exemplary inference rules may be used to supply an appropriate set of metadata that can be used for indexing a group that corresponds to a project file. The invention is not limited to any particular set of inference rules, and the following are provided by way of useful example only:

| | |
|---|---|
| <Name>: | Name of the project or similar file |
| <Description>: | Description of the project or similar file |
| <Icon>: | Default icon for unspecified icon templates |
| <Language>: | The extension of the project or similar file. |
| <DefaultName>: | Name of the project or similar file |
| <TemplateContent>: | This section is dynamically built based on the contents of the group: |
| <ProjectFile>: | The name of the project or similar file |
| <ProjectItems>: | The names of the other items in the project or similar file group. |
| <ReplaceParameters>: | This tag, which determines whether the file is searched for any parameters to replace, may always be set to TRUE for files without tailored metadata. |

Using the exemplary metadata above, the various files of a group may be indexed. Standard parameter substitution strings may be used in any file in the template. For instance, a typical replacement is to name the namespace in a C# or Visual Basic project with the same name as the project, e.g., "namespace ConsoleApplication1". The "project" name, as that term is used in the context of VISUAL STUDIO® comes from the user input in the dialog when the project is being created from a template. Other common replacements include an item name, again, in the context of VISUAL STUDIO®, a date, a time, a common language runtime version, and so forth.

The following is an example of a metadata file in Extensible Markup Language (XML) that is created using the inference rules set forth above:

```
<VSTemplate Version="1.1.0" Type="Project">>
    <TemplateData>
        <Name>
            <String>ConsoleApplication</String>
        </Name>
        <Description>
            <String>ConsoleApplication</String>
        </Description>
        <Icon>
            <Package GUID="{FAE04EC1-301F-11d3-BF4B-00C04F79EFBC}" ID="4548"/>
        </Icon>
        <ProjectType>
            <Languages>
                <Language>.csproj</Language>
            </Languages>
        </ProjectType>
        <DefaultName>ConsoleApplication</DefaultName>
    </TemplateData>
```

-continued

```
    <TemplateContent>
        <ProjectFile>
            <SourceFile>ConsoleApplication.csproj</SourceFile>
            <ReplaceParameters>true</ReplaceParameters>
        </ProjectFile>
        <ProjectContents>
            <ProjectItem>
                <SourceFile>AssemblyInfo.cs</SourceFile>
                <ReplaceParameters>true</ReplaceParameters>
            </ProjectItem>
            <ProjectItem>
                <SourceFile>Program.cs</SourceFile>
                <ReplaceParameters>true</ReplaceParameters>
            </ProjectItem>
        </ProjectContents>
    </TemplateContent>
</VSTemplate>
```

Copyright © 2003-2004, Microsoft Corp

Note that in the above example, the <TemplateData> section is rather sparse. Templates that are generated without any direction from the user may be supplied with a number of default properties, based on likely desires of a user. For instance, a CreateNewFolder property, which may determine whether a project is created in its own folder, may be automatically set to true. This property is used by 90% of project templates, and therefore supplying it as a default property may provide time savings for a user. A list of other exemplary defaults, in the contexts of project templates and item templates, that may be used in conjunction with the other systems an methods herein is provided in Appendix A and Appendix B.

After indexing a group, such as a project file group, according to metadata that supplies a standard set of inference rules, as set forth above, the completed template can be placed in a UI accessible location for later access and use by a user 44. The reason for adding the template to a UI accessible location is practical, and not required for all embodiments of the invention. In general, users prefer classifying templates in a single location or a small set of locations. That way, templates can be quickly referenced when new file is desired, a determination of a suitable template can be made, and a new file can be instantiated by selecting an appropriate template. If templates are stored individually, the selection of an appropriate template may become more tedious. Various embodiments may display the newly created template in a UI accessible location, such as one identified with opening a new project, a new item, and/or a new file. In a common arrangement, these locations are accessible to dialog processes, i.e., user interface (UI) windows that open when a user indicates a desire to open a new entity (such as a file, project, or item).

FIG. 5 provides a graphical representation of the steps in FIG. 4. An IDE process 51 can scan memory location 50, and convert any file groups therein into templates by creating metadata 53 for the group and placing them in a User Interface (UI) accessible location 52. Note that in various embodiments 50 and 52 may in fact be the same location.

Figure 6:
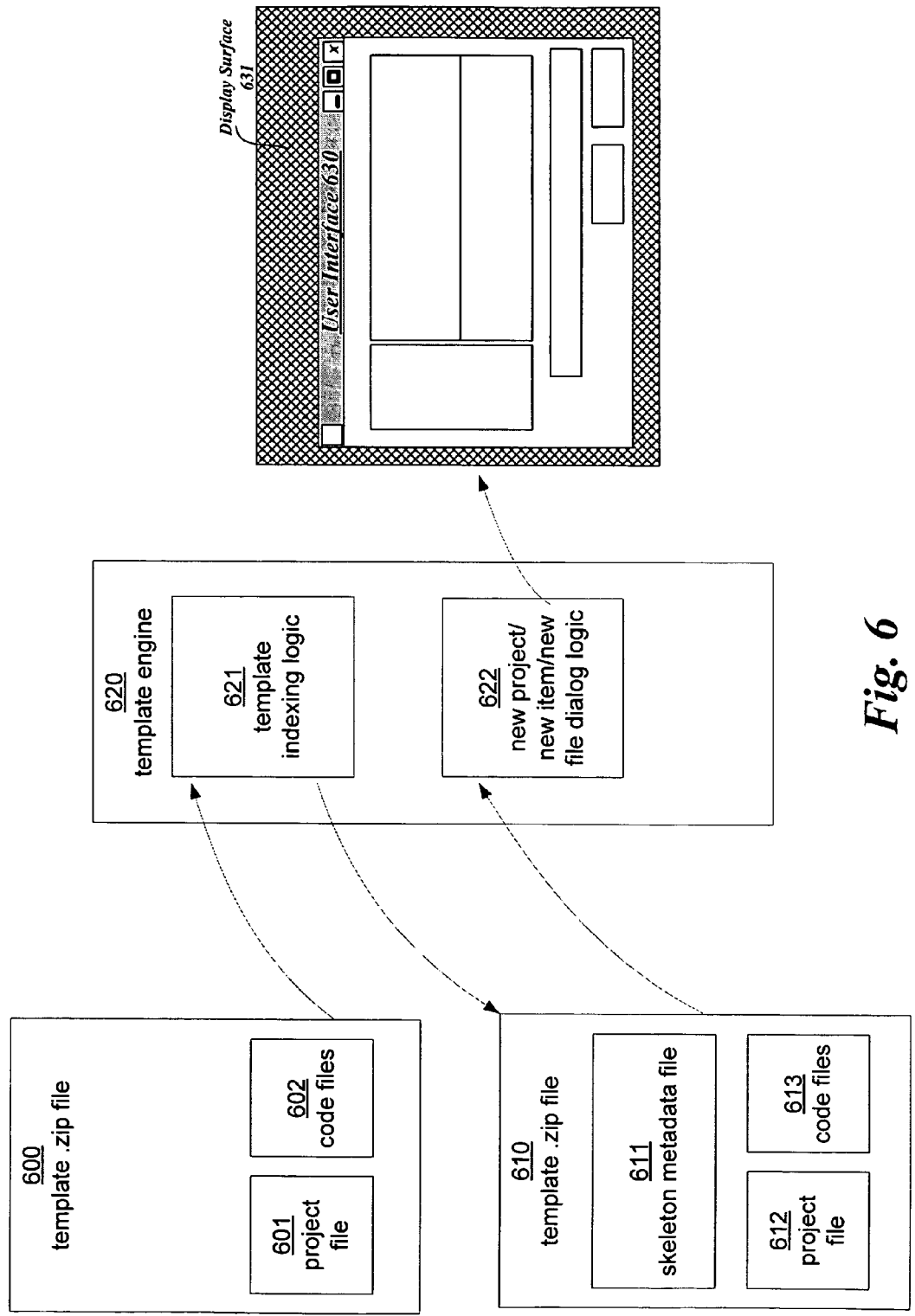
FIG. 6 illustrates various embodiments in which an IDE process, such as template engine 620, takes up a file group 600, creates a metadata file 611, and indexes the group 600 to create the template 610. The template 610 may be made available to UI process logic 622 that supports the user interface 630 presented to a user on a visual display 631.

FIG. 6 provides another view of various embodiments of the invention in which a IDE process, such as template engine 620 takes up a file group 600 with files 601 and 602. Template indexing logic 621 can create a metadata file 611 and index the group 600 accordingly. The indexed group 610 and metadata 611 make up a template that may be made available to UI process logic 622 that supports the user interface 631 presented to a user on a visual display 631.

In a preferred embodiment, template indexing logic 621 will parse all the known directories on disk where templates may be placed and detect the presence/absence of metadata files, e.g., .vstemplate files, for each template. If no metadata file is present, as is the case in group 600, a skeleton metadata 611 file may be created based on the name of the project file 601 and the contents of the ZIP file 600. The template 610 may then be created and inference rules may be applied to display and configure the template 610. The template 610 may be made available to a UI process 630 such as a New Project dialog. When selected, an instance of the template 610 will be created on disk, creating a substantially exact replica of the project 601, 602 ZIP'd by the user and placed in the template directories.

In light of the diverse computing environments that may be built by extending the general framework provided in FIG. 1, the systems and methods provided herein cannot be construed as limited in any way to a particular computing architecture. Instead, the present invention should not be limited to any single embodiment, but rather should be construed in breadth and scope in accordance with the appended claims.

APPENDIX A

Defaults for Project Templates

| Element | Default | Description |
|---|---|---|
| [Icon] Filepath | Default System-cached Project Template Icon | Relative path to the .ico file |
| SortOrder | Alphabetical | Template order in NPD. User templates may have alphabetical sort order. |
| CreateNewFolder | True | Whether a containing folder is created on instantiation |
| DefaultName | <Name> | The DefaultName in the Name file in the NPD, ex: ClassLibrary |
| ProvideDefaultName | False | Whether to provide a default DefaultName for the project in the name field |
| PromptForSaveOnCreation | True | Whether the project supports being a 'temporary' in-memory project |
| EnableLocationBrowseButton | True | Whether the user can browse to a different directory to create the solution |
| LocationField | Enabled | Whether the location field is enabled, disabled or hidden. Values: Enabled Disabled Hidden |
| Hidden | False | Specifies that the template should not appear in the New Project Dialog. If specified, no other elements inside <TemplateData> need be required |

Copyright © 2003-2004, Microsoft Corp

APPENDIX B

Defaults for Item Templates

| Element | Default | Description |
|---|---|---|
| [Icon] Filepath | Default System-cached Item Template Icon | Relative path to the .ico file |
| SortOrder | Alphabetical | Template order in ANID. User templates may have alphabetical sort order. |
| DefaultName | <Name> | The DefaultName in the Name file in the ANID, ex: Class |
| AppendDefaultExtension | True | If set to true, may create the target new file(s) with the same extension as the source files, ignoring what the user may have typed in the Add New Item dialog. (i.e., If user is creating C# class file and types "Foo.vb", may be created as "Foo.cs" |
| SupportsMasterPage | False | Whether the template supports having a master page (Web option) |
| SupportsCodeSeparation | False | Whether the template supports code separation (Web option) |
| SupportsLanguageDropdown | False | Whether the template is identical for multiple languages and a language dropdown can appear. |
| Hidden | False | Specifies that the template should not appear in the New Project Dialog. If specified, no other elements inside <TemplateData> need be required |

Copyright © 2003-2004, Microsoft Corp

What is claimed:

1. A computer implemented method for generating a project template comprising:
    searching a memory location for a group of files designated as a project template, by detecting files named with a common identifying string, wherein separate search logic is applied to each of at least one subdirectory associated with the memory location, wherein the at least one memory location is reserved for template creation and is accessible to a user interface ("UI") process;
    automatically generating a the project template by:
    if a preexisting metadata file is supplied with the group of files:
    indexing each file in the group of files using the preexisting metadata file;
    if a preexisting metadata file is not supplied:
    for each file in the group of files, identifying at least one element to be generalized using inference rules, wherein the inference rules are configurable to specify a user defined level of generalization and include a name inference rule, a description inference rule, an icon inference rule, a language inference rule, a template content inference rule, a project items inference rule and a replace parameters inference rule;

for each identified element, determining all occurrences of the identified element in the group of files;

using the inference rules to generate a metadata file corresponding to the identified elements, wherein the metadata file supplies an identification of each identified element;

generating the template, wherein the template comprises the generated metadata file and each indexed file;

storing the project template in a UI accessible location.

2. The method for generating a project template of claim 1, further comprising creating a new project from said project template.

3. The method for generating a project template of claim 2, further comprising prompting a user to specify data for each template element.

4. The method for generating a project template of claim 1, further comprising parsing a plurality of directories to direct a presence of preexisting metadata files.

5. The method for generating a project template of claim 4, further comprising creating a skeleton metadata file when the preexisting metadata file is not detected.

6. The method for generating a project template of claim 1, wherein said generating a project template is employed in an integrated development environment (IDE).

7. The method for generating a project template of claim 6, wherein the project comprises an item file.

8. A computer readable storage medium having stored thereon computer executable instructions comprising; searching a memory location for a group of files designated as a project template by detecting files named with a common identifying string, wherein separate search logic is applied to each of at least one subdirectory associated with the memory location, wherein the memory location is reserved for template creation and is accessible to a user interface ("UI") process; automatically generating the project template by:

if a preexisting metadata file is supplied with the group of files:

indexing each file in the group of files using the preexisting metadata file;

if a preexisting metadata file is not supplied:

for each file in the group of files, identifying at least one element to be generalized using inference rules, wherein the inference rules are configurable to specify a user defined level of generalization and include a name inference rule, a description inference rule, an icon inference rule, a language inference rule, a template content inference rule, a project items inference rule and a replace parameters inference rule; for each identified element, determining all occurrences of the identified element in the group of files; using the inference rules to generate a metadata file corresponding to the identified elements, wherein the metadata file supplies an identification of each identified element; generating the template, wherein the template comprises the generated metadata file and each indexed file; storing the project template in a UT accessible location.

9. The computer readable medium of claim 8, wherein the instructions further comprise creating a new project from said project template.

10. The computer readable medium of claim 9, wherein the instructions further comprise prompting a user to specify data for each template element.

11. The computer readable medium of claim 8, wherein the instructions further comprise parsing a plurality of directories to detect a presence of preexisting metadata files.

12. The computer readable medium of claim 11, wherein the instructions further comprise creating a skeleton metadata file.

13. The computer readable medium of claim 8, wherein said generating a project template is employed in an integrated development environment (IDE).

14. The computer readable medium of claim 13, wherein the project comprises an item file.

15. A system comprising:

a processor; and a memory having stored therein computer executable instructions comprising:

searching a memory location for a group of files designated as a project template by detecting files named with a common identifying string, wherein separate search logic is applied to each of at least one subdirectory associated with fie memory location, wherein the memory location is reserved for template creation and is accessible to a user interface ("UI") process;

automatically generating the project template by:

if a preexisting metadata file is supplied with the group of files:

indexing each file in the group of files using the preexisting metadata file;

if a preexisting metadata file is not supplied:

for each file in the group of files, identifying at least one element to be generalized using inference rules, wherein the inference rules are configurable to specify a user defined level of generalization and include a name inference rule, a description inference rule, an icon inference rule, a language inference rule, a template content inference rule, a project items inference rule and a replace parameters inference rule; for each identified element, determining all occurrences of the identified element in the group of files;

using the inference rules to generate a metadata file corresponding to the identified elements, wherein the metadata file supplies an identification of each identified element; generating the template, wherein the template comprises the generated metadata file and each indexed file;

storing the project template in a UI accessible location.

16. The system of claim 15, wherein the instructions further comprise creating a new project from said project template.

17. The system of claim 16, wherein the instructions further comprise prompting a user to specify data for each template element.

18. The system of claim 15, wherein the instructions M e r comprise parsing a plurality of directories to detect a presence of preexisting metadata files.

19. R e system of claim 18, wherein the instructions further comprise creating a skeleton metadata file.

20. The system of claim 15, wherein said generating a project template is employed in an integrated development environment (IDE).

21. The system of claim 20, wherein the project comprises an item file.

* * * * *

UNITED STATES PATENT AND TRADEMARK OFFICE
CERTIFICATE OF CORRECTION

PATENT NO. : 7,631,004 B2
APPLICATION NO. : 10/961753
DATED : December 8, 2009
INVENTOR(S) : Craig A. Skibo et al.

It is certified that error appears in the above-identified patent and that said Letters Patent is hereby corrected as shown below:

In column 10, line 57, in Claim 1, after "generating" delete "a".

In column 11, line 59, in Claim 8, delete "UT" and insert -- UI --, therefor.

In column 12, line 21, in Claim 15, delete "fie" and insert -- file --, therefor.

In column 12, line 54, in Claim 18, delete "M e r" and insert -- further --, therefor.

In column 12, line 57, in Claim 19, delete "R e" and insert -- The --, therefor.

Signed and Sealed this
First Day of February, 2011

David J. Kappos
*Director of the United States Patent and Trademark Office*